(12) United States Patent
Nozaki

(10) Patent No.: US 11,591,749 B2
(45) Date of Patent: Feb. 28, 2023

(54) STEEL CORD FOR RUBBER ARTICLE REINFORCEMENT, AND TIRE

(71) Applicant: BRIDGESTONE CORPORATION, Tokyo (JP)

(72) Inventor: Yuusuke Nozaki, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 368 days.

(21) Appl. No.: 16/900,196

(22) Filed: Jun. 12, 2020

(65) Prior Publication Data

US 2020/0308763 A1     Oct. 1, 2020

Related U.S. Application Data

(63) Continuation of application No. PCT/JP2018/044577, filed on Dec. 4, 2018.

(30) Foreign Application Priority Data

Dec. 15, 2017  (JP) .............................. JP2017-241075

(51) Int. Cl.
*D07B 1/06*     (2006.01)
*B60C 9/00*     (2006.01)

(52) U.S. Cl.
CPC .............. *D07B 1/0613* (2013.01); *B60C 9/00* (2013.01); *B60C 9/0007* (2013.01);
(Continued)

(58) Field of Classification Search
CPC .. D07B 1/0613; D07B 1/0626; D07B 1/0653; B60C 9/0007
See application file for complete search history.

(56) References Cited

U.S. PATENT DOCUMENTS 4,947,636 A * 8/1990 Sinopoli .............. D07B 1/0613
                                                     57/902
5,461,850 A * 10/1995 Bruyneel ............. D07B 1/0613
                                                     57/902
(Continued)

FOREIGN PATENT DOCUMENTS

CN       102066653 A      5/2011
EP         3617399 A1     3/2020
(Continued)

OTHER PUBLICATIONS

Extended Search Report dated Aug. 6, 2021 from the European Patent Office in Application No. 18887691.6.
(Continued)

*Primary Examiner* — Shaun R Hurley
(74) *Attorney, Agent, or Firm* — Sughrue Mion, PLLC

(57) ABSTRACT

Provided is a steel cord for rubber article reinforcement, which has both the tensile strength in the cord axial direction and the strength in the shear direction at higher levels. A steel cord (10) for rubber article reinforcement includes: a single core strand (11) having a layer-twisted structure; and plural sheath strands (12) each having a layer-twisted structure, and the sheath strands (12) are twisted around the core strand (11). In the sheath strands (12), a ratio between the diameter of a core filament (12a) and the diameter of a sheath filament (12b) is 0.75 to 0.85, and a ratio between the strength of the core filament (12a) and the strength of the sheath filament (12b) is 0.55 to 0.7.

20 Claims, 1 Drawing Sheet

(52) U.S. Cl.
CPC ......... *D07B 1/0626* (2013.01); *D07B 1/0653* (2013.01); *B60C 2009/0085* (2013.01); *B60C 2009/0092* (2013.01); *D07B 2201/202* (2013.01); *D07B 2201/2024* (2013.01); *D07B 2201/2051* (2013.01); *D07B 2501/2046* (2013.01); *D07B 2801/10* (2013.01); *D07B 2801/12* (2013.01); *D07B 2801/14* (2013.01)

(56) References Cited

U.S. PATENT DOCUMENTS

| | | | |
|---|---|---|---|
| 6,863,103 | B1 | 3/2005 | Masubuchi et al. |
| 2010/0170215 | A1* | 7/2010 | Nishimura ............. D07B 1/165 57/362 |
| 2011/0088825 | A1 | 4/2011 | Kudo |
| 2013/0032264 | A1* | 2/2013 | Cheng .................. D07B 1/0613 428/377 |
| 2017/0210169 | A1 | 7/2017 | Nozaki |
| 2017/0210170 | A1* | 7/2017 | Nozaki .................... B60C 9/00 |
| 2017/0211229 | A1* | 7/2017 | Nozaki .................... D07B 1/06 |
| 2017/0232798 | A1 | 8/2017 | Suzuki |
| 2019/0225018 | A1* | 7/2019 | Nozaki ................. B60C 9/0007 |
| 2019/0234016 | A1* | 8/2019 | Nozaki ................. D07B 1/0613 |
| 2019/0263179 | A1* | 8/2019 | Ikehara ................. D07B 1/0613 |
| 2020/0055341 | A1 | 2/2020 | Obana et al. |

FOREIGN PATENT DOCUMENTS

| | | |
|---|---|---|
| JP | 2009-084727 A | 4/2009 |
| JP | 2010-163727 A | 7/2010 |
| JP | 2011-032596 A | 2/2011 |
| JP | 5036294 B2 | 9/2012 |
| JP | 2013-227698 A | 11/2013 |
| JP | 2016-56456 A | 4/2016 |
| JP | 2016-069774 A | 5/2016 |
| WO | 2001/34900 A1 | 5/2001 |
| WO | 2016/017655 A1 | 2/2016 |
| WO | 2016/051669 A1 | 4/2016 |

OTHER PUBLICATIONS

International Search Report for PCT/JP2018/044577 dated Jan. 15, 2019 [PCT/ISA/210].

Chinese Search Report dated Oct. 11, 2021 from the China National Intellectual Property Administration in Chinese Application No. 201880080903.1.

* cited by examiner

STEEL CORD FOR RUBBER ARTICLE REINFORCEMENT, AND TIRE

CROSS REFERENCE TO RELATED APPLICATIONS

This application is a continuation of PCT/JP2018/044577, filed Dec. 4, 2018, which claims priority from Japan Patent Application No. JP2017-241075, filed Dec. 15, 2017, the disclosures of which are incorporated by reference herein.

TECHNICAL FIELD

The present invention relates to a steel cord for rubber article reinforcement, and a tire including the steel cord. Particularly, the present invention relates to a steel cord that is suitable for reinforcement of a pneumatic radial tire to be mounted on a heavy vehicle, such as a construction vehicle, a transportation vehicle or a construction machine.

BACKGROUND ART

Construction vehicle tires, which are mounted on large-sized dump trucks and the like utilized at large-scale civil engineering construction sites and ore mines, are subjected to harsh working conditions under heavy load on rough ground surfaces. For example, construction vehicle tires destined to be used for driving on rough ground are subjected to large inputs from the road surface as well as heavy loads. In addition, such tires are damaged on many occasions as a result of putting a heavy load against a rough ground surface. Therefore, in those steel cords that are used in reinforcing layers of carcasses, belts and the like of such tires, measures for improving the tensile breaking strength in the cord axial direction have been implemented by using steel cords having a large diameter and/or increasing the tensile breaking strength of the cords per unit area.

Moreover, when a heavy duty tire forced to run on rough ground runs over a relatively obtuse projection, it is often observed that belt layers thereof, particularly the belt layer on the innermost side, is largely bent, and a reinforcing steel cord is precedingly broken due to a tensile input in the cord axial direction. Meanwhile, when the tire runs over a relatively sharp projection, it is often observed that the belt layers are locally bent and a shear force from the projection causes cord breakage, particularly from the belt reinforcing layer closest to the tread. Therefore, a steel cord to be applied to a construction vehicle tire as a reinforcing material is demanded to have both a tensile strength in the cord axial direction and a strength in the shear direction.

Accordingly, there has been disclosed a steel cord for rubber article reinforcement in which the durability against cuts such as notches and perforations, which are generated by running over obtuse or sharp projections, is improved without deteriorating the strength in the cord axial direction (Patent Document 1).

RELATED ART DOCUMENT

Patent Document

[Patent Document 1] JP2013-227698A

SUMMARY OF THE INVENTION

Problems to be Solved by the Invention

The steel cord for rubber article reinforcement disclosed in Patent Document 1 has both a tensile strength in the cord axial direction and a strength in the shear direction. Nevertheless, the demand for further improvement in the properties of a construction vehicle tire has not stopped.

In view of the above, an object of the present invention is to provide: a steel cord for rubber article reinforcement, which has both the tensile strength in the cord axial direction and the strength in the shear direction at higher levels; and a tire in which this steel cord for rubber article reinforcement is applied as a reinforcing material.

Means for Solving the Problems

The present inventor intensively studied to solve the above-described problems and consequently discovered that the cut resistance can be improved by adjusting the material of steel filaments constituting a steel cord, particularly the ratio of the strength between core filaments and sheath filaments of sheath strands, and thereby inhibiting the wire internal preceding breakage of the filaments.

The steel cord for rubber article reinforcement according to the present invention is a steel cord for rubber article reinforcement that includes: a single core strand having a layer-twisted structure formed by twisting plural steel filaments; and plural sheath strands each having a layer-twisted structure formed by twisting plural steel filaments, which sheath strands are twisted around the core strand, the steel cord being characterized in that: a ratio between a diameter of a core filament and a diameter of a sheath filament in the sheath strands (a ratio of the core filament diameter with respect to the sheath filament diameter; the same applies below) is 0.75 to 0.85; and a ratio between a strength of the core filament and a strength of the sheath filament is 0.55 to 0.7.

In the steel cord for rubber article reinforcement according to the present invention, it is preferred that: a tensile strength of a core filament and a tensile strength of a sheath filament in the core strand be substantially the same; and a ratio between the tensile strength of the core filament and the tensile strength of the sheath filament in the sheath strands be 0.95 or higher but lower than 1.00. Further, it is preferred that: the number of the sheath strands be 6 to 9; the steel cord have a diameter of not less than 4 mm; the core strand have a core filament diameter of 0.32 to 0.50 mm and a sheath filament diameter of 0.40 to 0.50 mm; the sheath strands have the core filament diameter of 0.28 to 0.36 mm and the sheath filament diameter of 0.34 to 0.45 mm; in the core strand, the number of core filaments be 1 to 3 and the number of sheath filaments be 5 to 9; and, in the sheath strands, the number of core filaments be 1 to 3 and the number of sheath filaments be 5 to 9.

A tire of the present invention is characterized by including the above-described steel cord for rubber article reinforcement according to the present invention as a reinforcing material.

Effects of the Invention

According to the present invention, a construction vehicle tire, in which the strength of core filaments of sheath strands is controlled to be lower than that of sheath filaments of the sheath strands so as to allow the core filaments to have superior ductility than the sheath filaments, whereby the shear resistance is enhanced and the cut resistance is improved, can be provided.

MODE FOR CARRYING OUT THE INVENTION

Figure 1:
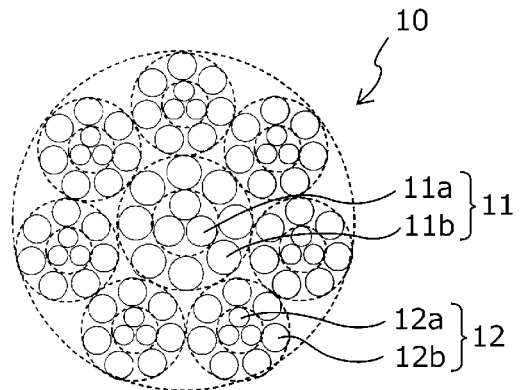
FIG. 1 is a cross-sectional view illustrating one embodiment of a steel cord for rubber article reinforcement according to the present invention.

Embodiments of the steel cord for rubber article reinforcement according to the present invention (hereinafter, also referred to as "steel cord of the present invention") will now be described concretely referring to the drawings.

A steel cord 10 of the present embodiment, which is illustrated in FIG. 1, includes: a single core strand 11; and plural, specifically seven sheath strands 12 which are twisted around the core strand 11. A wrapping filament may be wound around the sheath strands 12, although it is not illustrated in the drawing.

The core strand 11 is formed by twisting plural steel filaments and, more particularly, the core strand 11 has a bilayer-twisted structure constituted by plural, specifically three core filaments 11a, and plural, specifically eight sheath filaments 11b which are twisted around the core filaments 11a. Further, the sheath strands 12 are each formed by twisting plural filaments and, more particularly, the sheath strands 12 have a twisted structure of at least two layers constituted by plural, specifically three core filaments 12a, and plural, specifically seven sheath filaments 12b which are twisted around the core filaments 12a.

The steel cord 10 of the present embodiment has a double-twist structure in which the core strand 11 and the sheath strands 12 are each formed by twisting plural filaments and these core strand 11 and sheath strands 12 are twisted together.

In the steel cord 10 of the present embodiment, a ratio between the diameter of the core filaments 12a and the diameter of the sheath filaments 12b in the sheath strands 12 is 0.75 to 0.85. Further, a ratio between the strength of the core filaments 12a and the strength of the sheath filaments 12b in the sheath strands 12 is 0.55 to 0.7.

The ratio between the diameter of the core filaments 12a and the diameter of the sheath filaments 12b in the sheath strands 12 being 0.75 to 0.85 means that the diameter of the sheath filaments 12b of the sheath strands 12 is relatively larger than the diameter of the core filaments 12a. In the steel cord 10, when a tension is applied thereto and the sheath strands 12 are tightened toward the core strand 11, a stress caused by this tightening is concentrated on the sheath filaments 12b that correspond to the outermost side of the respective sheath strands 12. By controlling the diameter of the sheath filaments 12b to be relatively larger than the diameter of the core filaments 12a, the breaking resistance is improved, and preceding breakage is thereby inhibited.

The ratio between the strength of the core filaments 12a and the strength of the sheath filaments 12b in the sheath strands 12 being 0.55 to 0.7 means that the strength of the core filaments 12a is lower than the strength of the sheath filaments 12b at a prescribed ratio. By controlling the strength of the core filaments 12a to be lower than the strength of the sheath filaments 12b, the core filaments 12a are allowed to have superior ductility than the sheath filaments 12b, whereby the resistance to a shear force can be enhanced and the cut resistance can be improved.

However, a reduction in the strength of filaments in sheath strands could result in a reduction in the tensile strength of the sheath strands. Therefore, in the steel cord for rubber article reinforcement according to the present invention, a reduction in the tensile strength of the sheath strands is inhibited by lowering only the strength of the core filaments 12a, which are relatively finer than the sheath filaments 12b, in the sheath strands 12. In this manner, in the steel cord of the present invention, a high cut resistance and a high tensile strength are realized with an excellent balance.

In addition, gaps are generated by controlling the core filaments 12a to be relatively finer than the sheath filaments 12b in the sheath strands 12, so that the rubber permeability can be improved and the rust resistance of the steel cord can be enhanced.

When the ratio between the diameter of the core filaments 12a and the diameter of the sheath filaments 12b in the sheath strands 12 is lower than 0.75, the strength of the steel cord may be reduced. Meanwhile, when this ratio is higher than 0.85, an improvement in the cut resistance, which is expected in the present invention, may not be attained sufficiently. Further, when the ratio between the strength of the core filaments 12a and the strength of the sheath filaments 12b in the sheath strands 12 is lower than 0.55, the strength of the steel cord may be reduced. Meanwhile, when this ratio is higher than 0.7, an improvement in the cut resistance, which is expected in the present invention, may not be attained sufficiently.

In the steel cord 10 of the present embodiment, it is preferred that the tensile strength of the core filaments 11a and the tensile strength of the sheath filaments 11b in the core strand 11 be substantially the same and, at the same time, the ratio between the tensile strength of the core filaments 12a and the tensile strength of the sheath filaments 12b in the sheath strands 12 be in a range of 0.95 to lower than 1.00. By this, with regard to the core strand 11, a high tensile strength is ensured without adjusting the tensile strength of the respective materials of the core filaments 11a and the sheath filaments 11b, and only the core filaments 12a of the sheath strands 12 are allowed to have excellent ductility, whereby excellent cut resistance can be attained. When the ratio between the tensile strength of the core filaments 12a and that of the sheath filaments 12b is in a range of 0.95 to lower than 1.00, a high cut resistance (shear resistance) and a high cord strength, which are expected in the present invention, are attained with an excellent balance.

Even when the tensile strength of the core filaments 12a is lower than that of the sheath filaments 12b in the sheath strands 12, the filaments other than the core filaments 12a, namely the sheath filaments 12b, as well as the core filaments 11a and the sheath filaments 11b of the core strand have a relatively large wire diameter; therefore, a reduction in the strength of the steel cord 10 is inhibited.

It is noted here that, in the core strand 11, the tensile strength of the core filaments 11a and that of the sheath filaments 11b are not restricted to be substantially the same. In the core strand 11, the tensile strength of the core filaments 11a may be higher than that of the sheath filaments 11b. By this, the steel cord can attain even a higher cord strength.

In the steel cord 10 of the present embodiment, the number of the sheath strands is preferably 6 to 9. By setting the number of the sheath strands to be 6 to 9, a high cord strength can be attained, making the steel cord suitable for construction vehicle tires and the like. When the number of the sheath strands is less than 6, it is difficult to attain a sufficient tensile strength with respect to a cord cross-section. In addition, when the winding number of the sheath strands is 10 or greater, the sheath strands are reduced in thickness, and this consequently makes the filaments constituting the sheath strands extremely thin; therefore, a flexural tensile input resulting from running over an obtuse projection causes preceding breakage of the filaments constituting the sheath strands, making it difficult to attain a sufficient cut resistance.

It is preferred that the steel cord 10 for rubber article reinforcement according to the present embodiment have a cord diameter of not less than 4 mm so as to ensure a rubber article to have a satisfactory strength. By controlling the cord diameter to be not less than 4 mm, a high cord strength can be attained, making the steel cord suitable for construction vehicle tires and the like.

In the steel cord 10 of the present embodiment, it is preferred that the core filaments 11a have a diameter of 0.32 to 0.50 mm and the sheath filaments 11b have a diameter of 0.40 to 0.50 mm in the core strand 11. By controlling the core filaments 11a to have a diameter of 0.32 to 0.50 mm and the sheath filaments 11b to have a diameter of 0.40 to 0.50 mm in the core strand 11, the steel cord of the present invention that has a high cord strength and a high shear resistance can be easily designed.

In the steel cord 10 of the present embodiment, it is preferred that the core filaments 12a have a diameter of 0.28 to 0.36 mm and the sheath filaments 12b have a diameter of 0.34 to 0.45 mm in the sheath strands 12. By controlling the core filaments 12a to have a diameter of 0.28 to 0.36 mm and the sheath filaments 12b to have a diameter of 0.34 to 0.45 mm in the sheath strands 12, the steel cord of the present invention that has a high cord strength and a high shear resistance can be easily designed.

In the steel cord 10 of the present embodiment, it is preferred that the number of the core filaments 11a be 1 to 3 and the number of the sheath filaments 11b be 5 to 9 in the core strand 11. By controlling the number of the core filaments 11a to be 1 to 3 and the number of the sheath filaments 11b to be 5 to 9 in the core strand 11, the steel cord of the present invention that has a high cord strength and a high shear resistance can be easily designed.

In the steel cord 10 of the present embodiment, the number of the core filaments 12a is 1 to 3 and that of the sheath filaments 12b is 5 to 9 in each of the sheath strands 12; therefore, the steel cord of the present invention that has a high cord strength and a high shear resistance can be easily designed.

Figure 2:
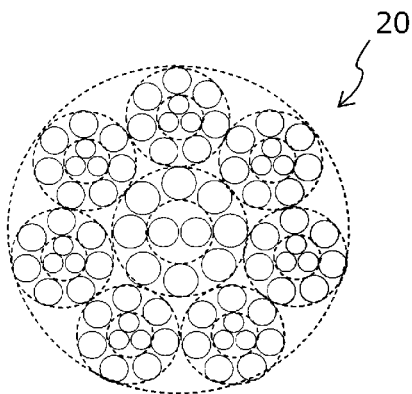
FIG. 2 is a cross-sectional view illustrating another embodiment of the steel cord for rubber article reinforcement according to the present invention.

The steel cord for rubber article reinforcement according to the present invention is not limited to the steel cord 10 having a 3+8+7×(3+7) cord structure, which is illustrated in FIG. 1. For example, the steel cord for rubber article reinforcement according to the present invention can be a steel cord 20 having a 2+8+7×(3+7) structure, which is illustrated in FIG. 2, and may have other cord structure as long as the requirements of the present invention are satisfied.

In the steel cord for rubber article reinforcement according to the present invention, it is preferred that the core strand have a bilayer-twisted structure and the sheath strands each have a twisted structure of at least two layers. By allowing the core strand to have a bilayer-twisted structure, the core filaments and sheath filaments thereof can be configured to have different filament diameters. Further, by allowing the sheath strands to each have a twisted structure of at least two layers, the core filaments and sheath filaments thereof can be configured to have different filament diameters as well as different tensile strengths.

The steel cord for rubber article reinforcement according to the present invention preferably has a structure in which the core strand and the sheath strands are twisted in the same direction so as to avoid breakage caused by concentration of stress due to line contact in the respective strands. Further, in the steel cord for rubber article reinforcement according to the present invention, in order to inhibit distortion of the cord and to ensure good factory workability and the like, a wrapping filament is preferably wound around the outer circumference of the cord. The wrapping filament is, however, not an indispensable element in the present invention.

The steel cord of the present invention can be used as a tire reinforcing material and, for example, a rubberized cloth is prepared by arranging a plurality of the steel cords in parallel to one another at prescribed intervals and embedding the steel cords in a rubber sheet, and this rubberized cloth can be applied as a reinforcing material to at least one layer of a carcass or belt of a tire. Examples of the tire of the present invention to which the steel cord of the present invention is applied as a reinforcing material of a belt include a tire that includes: a carcass composed of a ply of steel cords, which extends in the radial direction between a pair of bead cores; at least two, usually six belt layers, which are arranged on the tire radial-direction outer side of the carcass in the crown portion; and a tread arranged on the tire radial-direction outer side of the belts.

A more concrete mode of a construction vehicle tire to which the steel cord of the present invention can be applied as a reinforcing material of a belt is a tire that includes: a carcass which is composed of a ply made of radially arrayed cords; and at least four belt layers formed by arranging parallelly-arrayed cords on the radial-direction outer side of the carcass in the crown portion such that the cords intersect with each other between the resulting laminated layers, and it is preferred to apply the steel cord of the present invention to the cords constituting at least two of the belt layers. In such a construction vehicle tire to which the steel cord of the present invention is applied, not only cord breakage is inhibited since a good strength in the axial direction of the belt reinforcing cords can be maintained even when the tire is driven on a rough ground and runs over a relatively obtuse projection, but also cord breakage is inhibited in a favorable manner even when the tire runs over a relatively sharp projection.

The use of the steel cord of the present invention is not limited to the above-described tire reinforcing material, and the steel cord of the present invention can also be used as a reinforcing material of a rubber article, such as a crawler or a conveyor belt.

EXAMPLES

Figure 3:
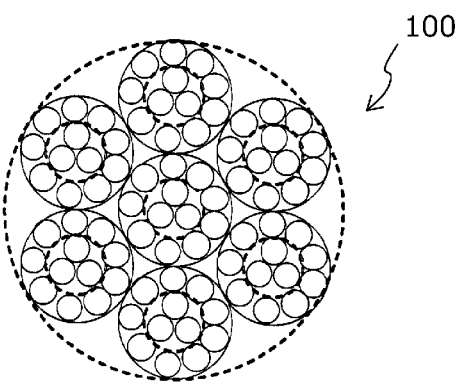
FIG. 3 is a cross-sectional view of a steel cord for rubber article reinforcement according to a comparative example.

Table 1 shows data for the production of various steel cords. As for the cross-sectional structures orthogonal to the cord axis of the respective steel cords, the steel cords of Examples 1, 4 and 5 and Comparative Examples 3, 4 and 5 shown in Table 1 have the cord structure illustrated in FIG. 1; the steel cords of Examples 2, 3 and 6 have the cord structure illustrated in FIG. 2; and the steel cords of Comparative Examples 1 and 2 have the 7×(3+9) cord structure of a steel cord represented by a symbol 100 in FIG. 3. In Comparative Examples 1 and 2, all filaments have the same diameter.

With regard to these steel cords, the predicted resistance to shear failure and the predicted rubber permeability (rubber penetration) are evaluated. In Table 1, the predicted cord strength and the predicted shear resistance are indicated as index values taking the values of Comparative Example 1 as 100, and the predicted rubber penetration is indicated in terms of rubber permeability. For all of the precicted cord strength, the predicted shear resistance and the predicted rubber penetration, a higher value means a superior property.

TABLE 1

|  |  |  | Comparative Example 1 | Comparative Example 2 | Example 1 | Comparative Example 3 | Example 2 |
|---|---|---|---|---|---|---|---|
|  | Cord structure |  | 7 × (3 + 9) | 7 × (3 + 9) | 3 + 8 + 7 × (3 + 7) | 3 + 8 + 7 × (3 + 7) | 2 + 8 + 7 × (3 + 7) |
| Core strand | Strand structure |  | 3 + 9 | 3 + 9 | 3 + 8 | 3 + 8 | 2+8 |
|  | Core filament | Strength (N) | 311 | 285 | 375 | 401 | 433 |
|  |  | Wire diameter (mm) | 0.36 | 0.36 | 0.41 | 0.43 | 0.455 |
|  |  | Tensile strength (MPa) | 3,055 | 2,800 | 2,840 | 2,761 | 2,663 |
|  | Sheath filament | Strength (N) | 311 | 311 | 427 | 401 | 433 |
|  |  | Wire diameter (mm) | 0.36 | 0.36 | 0.45 | 0.43 | 0.455 |
|  |  | Tensile strength (MPa) | 3,055 | 3,055 | 2,685 | 2,761 | 2,663 |
|  | Difference in tensile strength (core-sheath) |  | 0 | −255 | 156 | 0 | 0 |
| Sheath strand | Strand structure |  | 3 + 9 | 3 + 9 | 3 + 7 | 3 + 7 | 3 + 7 |
|  | Core filament | Strength (N) | 311 | 311 | 208 | 227 | 214 |
|  |  | Wire diameter (mm) | 0.36 | 0.36 | 0.28 | 0.295 | 0.285 |
|  |  | Tensile strength (MPa) | 3,055 | 3,055 | 3,378 | 3,321 | 3,355 |
|  | Sheath filament | Strength (N) | 311 | 311 | 324 | 304 | 317 |
|  |  | Wire diameter (mm) | 0.36 | 0.36 | 0.37 | 0.355 | 0.365 |
|  |  | Tensile strength (MPa) | 3,055 | 3,055 | 3,013 | 3,071 | 3,030 |
|  | Ratio of filament wire diameter (core/sheath) |  | 1.00 | 1.00 | 0.76 | 0.83 | 0.78 |
|  | Ratio of filament strength (core/sheath) |  | 1.00 | 1.00 | 0.64 | 0.75 | 0.68 |
|  | Ratio of filament tensile strength (core/sheath) |  | 1.00 | 1.00 | 1.12 | 1.08 | 1.11 |
| Evaluation results | Core strength |  | 100 | 90 | 102 | 100 | 101 |
|  | Shear resistance |  | 100 | 90 | 101 | 98 | 100 |
|  | Rubber penetration |  | 30 | 30 | 70 | 80 | 75 |

|  |  |  | Comparative Example 4 | Comparative Example 5 | Example 3 | Example 4 | Example 5 | Example 6 |
|---|---|---|---|---|---|---|---|---|
|  | Cord structure |  | 3 + 8 + 7 × (3 + 7) | 3 + 8 + 7 × (3 + 7) | 2 + 8 + 7 × (3 + 7) | 3 + 8 + 7 × (3 + 7) | 3 + 8 + 7 × (3 + 7) | 2 + 8 + 7 × (3 + 7) |
| Core strand | Strand structure |  | 3 + 9 | 3 + 8 | 2 + 8 | 3 + 8 | 3 + 8 | 2 + 8 |
|  | Core filament | Strength (N) | 349 | 440 | 345 | 375 | 401 | 433 |
|  |  | Wire diameter (mm) | 0.39 | 0.46 | 0.455 | 0.41 | 0.43 | 0.455 |
|  |  | Tensile Strength (MPa) | 2,922 | 2,648 | 2,122 | 2,840 | 2,761 | 2,663 |
|  | Sheath filament | Strength (N) | 401 | 440 | 433 | 427 | 401 | 433 |
|  |  | Wire diameter (mm) | 0.43 | 0.46 | 0.455 | 0.45 | 0.43 | 0.455 |
|  |  | Tensile strength (MPa) | 2,761 | 2,648 | 2,663 | 2,685 | 2,761 | 2,663 |
|  | Difference in tensile strength (core-sheath) |  | 160 | 0 | −541 | 156 | 0 | 0 |

TABLE 1-continued

| | | | | | | | | |
|---|---|---|---|---|---|---|---|---|
| Sheath strand | Strand structure | | 3 + 8 | 3 + 7 | 3 + 7 | 3 + 7 | 3 + 7 | 3 + 7 |
| | Core filament | Strength (N) | 160 | 190 | 514 | 184 | 200 | 190 |
| | | Wire diameter (mm) | 0.26 | 0.285 | 0.285 | 0.28 | 0.295 | 0.285 |
| | | Tensile strength (MPa) | 3,014 | 2,978 | 3,355 | 2,988 | 2,926 | 2,978 |
| | Sheath filament | Strength (N) | 300 | 272 | 317 | 324 | 304 | 317 |
| | | Wire diameter (mm) | 0.35 | 0.33 | 0.365 | 0.37 | 0.355 | 0.365 |
| | | Tensile strength (MPa) | 3,118 | 3,180 | 3,030 | 3,013 | 3,071 | 3,030 |
| | Ratio of filament wire diameter (core/sheath) | | 0.74 | 0.86 | 0.78 | 0.76 | 0.83 | 0.78 |
| | Ratio of filament strength (core/sheath) | | 0.53 | 0.71 | 0.68 | 0.57 | 0.66 | 0.60 |
| | Ratio of filament tensile strength (core/sheath) | | 0.97 | 0.94 | 1.11 | 0.99 | 0.95 | 0.98 |
| Evaluation results | Cord strength | | 85 | 90 | 95 | 108 | 105 | 107 |
| | Shear resistance | | 85 | 90 | 95 | 110 | 106 | 108 |
| | Rubber penetration | | 30 | 80 | 75 | 70 | 80 | 75 |

Comparing Example 1, Comparative Example 3, Comparative Example 4, Comparative Example 5 and Examples 4 and 5 which all have the same cord structure, Examples 1, 4 and 5 are superior to Comparative Examples 3, 4 and 5 in terms of the cord strength and the shear resistance. Particularly, Examples 4 and 5 are cords having a highly excellent balance of the cord strength index, the shear resistance index and the rubber penetration, which are 105 or higher, 105 or higher, and 70 or higher, respectively.

Example 2 having a cord structure different from that of Comparative Example 1 is superior to Comparative Example 1 in terms of the cord strength index and the rubber penetration. Example 3 is a case where the core filaments of the core strand have a lower tensile strength than in Example 2, and Example 3 is inferior to Comparative Example 1 in terms of the cord strength index and the shear resistance; however, as compared to the amount of reduction in the index values of the cord strength and the shear resistance of Comparative Example 2 with respect to Comparative Example 1, Example 3 rather exhibits a smaller amount of reduction in these index values. Example 6 is a cord having a highly excellent balance of the cord strength index, the shear resistance index and the rubber penetration, which are 105 or higher, 105 or higher, and 70 or higher, respectively.

DESCRIPTION OF SYMBOLS

10, 20, 100: steel cord, 11: core strand, 11a: core filament, 11b: sheath filament, 12: sheath strand, 12a: core filament, 12b: sheath filament

The invention claimed is:

1. A steel cord for rubber article reinforcement, comprising:
   a single core strand having a layer-twisted structure formed by twisting plural steel filaments; and
   plural sheath strands each having a layer-twisted structure formed by twisting plural steel filaments,
   which sheath strands are twisted around the core strand,
   wherein
   a ratio between a diameter of a core filament and a diameter of a sheath filament in the sheath strands is 0.75 to 0.85, and
   a ratio between a strength of the core filament and a strength of the sheath filament in the sheath strands is 0.55 to 0.7.

2. The steel cord for rubber article reinforcement according to claim 1, wherein
   a tensile strength of a core filament and a tensile strength of a sheath filament in the core strand are the same, and
   a ratio between the tensile strength of the core filament and the tensile strength of the sheath filament in the sheath strands is 0.95 or higher but lower than 1.00.

3. The steel cord for rubber article reinforcement according to claim 2, wherein the number of the sheath strands is 6 to 9.

4. The steel cord for rubber article reinforcement according to claim 2, having a cord diameter of not less than 4 mm.

5. The steel cord for rubber article reinforcement according to claim 2, wherein the core strand has a core filament diameter of 0.32 to 0.50 mm and a sheath filament diameter of 0.40 to 0.50 mm.

6. The steel cord for rubber article reinforcement according to claim 2, wherein the sheath strands have the core filament diameter of 0.28 to 0.36 mm and the sheath filament diameter of 0.34 to 0.45 mm.

7. The steel cord for rubber article reinforcement according to claim 2, wherein, in the core strand,
   the number of core filaments is 1 to 3, and
   the number of sheath filaments is 5 to 9.

8. The steel cord for rubber article reinforcement according to claim 2, wherein, in the sheath strands,
   the number of core filaments is 1 to 3, and
   the number of sheath filaments is 5 to 9.

9. A tire comprising the steel cord for rubber article reinforcement according to claim 2 as a reinforcing material.

10. The steel cord for rubber article reinforcement according to claim 1, wherein the number of the sheath strands is 6 to 9.

11. The steel cord for rubber article reinforcement according to claim 10, having a cord diameter of not less than 4 mm.

12. The steel cord for rubber article reinforcement according to claim 10, wherein the core strand has a core filament diameter of 0.32 to 0.50 mm and a sheath filament diameter of 0.40 to 0.50 mm.

13. The steel cord for rubber article reinforcement according to claim 10, wherein the sheath strands have the core filament diameter of 0.28 to 0.36 mm and the sheath filament diameter of 0.34 to 0.45 mm.

14. The steel cord for rubber article reinforcement according to claim 10, wherein, in the core strand, the number of core filaments is 1 to 3, and the number of sheath filaments is 5 to 9.

15. The steel cord for rubber article reinforcement according to claim 1, having a cord diameter of not less than 4 mm.

16. The steel cord for rubber article reinforcement according to claim 1, wherein the core strand has a core filament diameter of 0.32 to 0.50 mm and a sheath filament diameter of 0.40 to 0.50 mm.

17. The steel cord for rubber article reinforcement according to claim 1, wherein the sheath strands have the core filament diameter of 0.28 to 0.36 mm and the sheath filament diameter of 0.34 to 0.45 mm.

18. The steel cord for rubber article reinforcement according to claim 1, wherein, in the core strand, the number of core filaments is 1 to 3, and the number of sheath filaments is 5 to 9.

19. The steel cord for rubber article reinforcement according to claim 1, wherein, in the sheath strands, the number of core filaments is 1 to 3, and the number of sheath filaments is 5 to 9.

20. A tire comprising the steel cord for rubber article reinforcement according to claim 1 as a reinforcing material.

* * * * *